United States Patent
Kleiner et al.

(10) Patent No.: US 6,798,428 B1
(45) Date of Patent: Sep. 28, 2004

(54) METHOD AND APPARATUS FOR PROCESSING DATA OF A TECHNICAL INSTALLATION STORED IN A USER-SPECIFIC MANNER IN DIFFERENT DATA MEMORIES

(75) Inventors: Michael Kleiner, Hamburg (DE); Uwe Röben, Adelsdorf (DE); Adolf Sturm, Hamburg (DE)

(73) Assignee: Framatome ANP GmbH, Erlangen (DE)

( * ) Notice: Subject to any disclaimer, the term of this patent is extended or adjusted under 35 U.S.C. 154(b) by 465 days.

(21) Appl. No.: 09/659,002

(22) Filed: Sep. 11, 2000

Related U.S. Application Data

(63) Continuation of application No. PCT/DE99/00198, filed on Jan. 26, 1999.

(30) Foreign Application Priority Data

Mar. 9, 1998 (DE) .......................................... 198 10 045

(51) Int. Cl.[7] .............................................. G09G 5/00
(52) U.S. Cl. ...................... 345/771; 345/965; 345/804; 345/841
(58) Field of Search .......................... 717/174; 345/803, 345/855, 802, 966, 968, 771, 713, 961, 962, 965, 967, 970, 843; 700/97

(56) References Cited

U.S. PATENT DOCUMENTS

| | | | |
|---|---|---|---|
| 5,367,624 A | * 11/1994 | Cooper ........................ | 345/734 |
| 5,544,299 A | * 8/1996 | Wenstrand et al. ......... | 345/804 |
| 5,588,109 A | 12/1996 | Dickinson et al. | |
| 5,666,501 A | * 9/1997 | Jones et al. .................. | 345/748 |
| 5,838,973 A | * 11/1998 | Carpenter-Smith et al. . | 717/105 |
| 6,239,800 B1 | * 5/2001 | Mayhew et al. ............. | 345/764 |
| 6,587,108 B1 | * 7/2003 | Guerlain et al. ............. | 345/440 |
| 6,597,381 B1 | * 7/2003 | Eskridge et al. ............. | 345/804 |

FOREIGN PATENT DOCUMENTS

EP  0 389 132 A2  9/1990

OTHER PUBLICATIONS

Published International Application No. WO 94/27195 (Kürten et al.), dated Nov. 24, 1994, as mentioned on p. 2 of the specification.

"Das Prozeßleitsystem Advant OCS von ABB" (Epple), dated Dec. 17, 1996, Automatisierungstechnische Praxis 38, pp. 37–45, pertains to the process control system Advant OCS by ABB, as mentioned on p. 2 of the specification.

* cited by examiner

*Primary Examiner*—John Cabeca
*Assistant Examiner*—Namitha Pillai
(74) *Attorney, Agent, or Firm*—Laurence A. Greenberg; Werner H. Stemer; Ralph E. Locher

(57) ABSTRACT

Particularly simple selection of data in all of the operating phases for a technical installation is achieved according to the invention, in a method for processing data which are user-specifically stored in different data memories. The functional groups for process control and the functional groups for the installation are each assigned to a selection field of a common selection mask. When one of the selection fields is selected, the respective process data relevant to the process control of the installation or installation data relevant to the installation are selected and displayed in a further display level.

4 Claims, 2 Drawing Sheets

METHOD AND APPARATUS FOR PROCESSING DATA OF A TECHNICAL INSTALLATION STORED IN A USER-SPECIFIC MANNER IN DIFFERENT DATA MEMORIES

CROSS-REFERENCE TO RELATED APPLICATION

This is a continuation of copending international application PCT/DE99/00198, filed Jan. 26, 1999, which designated the United States.

BACKGROUND OF THE INVENTION

FIELD OF THE INVENTION

The invention relates to a method and to an apparatus for processing data or information of a technical installation, in particular of a power station installation, which are stored in different data memories in a user-specific manner. In this case, different data memories are understood to mean, in particular, different information processing systems, data processing systems or databases which are based on different operating systems.

In a power station installation, an operational control system should enable not only process control and monitoring but also maintenance of the power station installation. To that end, the operational control system is divided into a number of functional units or systems. The functions required for the respective system are thereby usually structured into a number of functional groups. Such a system is disclosed, for example, in the commonly assigned U.S. Pat. No. 5,706,207 (corresp. to published international application WO 94/27195).

By way of example, the operational control system comprises for process control purposes, as a first system, an automation system which serves for acquiring physical quantities in the form of measured values or indication signals and subsequently processing them to form control signals which control installation sections or components of the power station installation.

A second system, a process control and/or process information system, which processes, visualizes and evaluates the information or data of the automation system, serves for process monitoring and process analysis. Such a system is disclosed, for example, in the document "ABB Technik" [ABB Technology] January 1997, pages 13–18; or the document "atp", December 1996 pages 37–45.

A third system, a management, maintenance or administration system, serves for monitoring finances and also material management and documentation of the power station installation. All three systems of the operational control system are connected to one another via interfaces or data bus systems. With increasing energy and/or work utilization of such installations and also with increasing improvement in their safety standards, the requirements imposed on the individual systems of the operational control system with regard to the processing and storage of large volumes of data also become more stringent. Because of this, the information or data obtained in the individual systems are hierarchically built up and archived therein using information filters that are provided. Often, specific hardware and software systems which are suited to the respective requirements and differ greatly in terms of their performance are used in the individual hierarchical levels and/or in the individual systems. In order to display compressed information or data in a higher hierarchical level or in another system, it is often necessary to convert the data of the subordinate hierarchical levels or of the other system. This is particularly time-intensive and highly complicated owing to the complexity of such systems. Furthermore, a complex display of information of all relevant systems including all hierarchical levels is not possible. Rather, the different systems each have to be called individually.

SUMMARY OF THE INVENTION

The object of the invention is to provide a method for processing data or information of a technical installation which overcomes the above-noted deficiencies and disadvantages of the prior art devices and methods of this kind, and which enables the selection of data in all of the operating phases, that is to say even in the case of irregularities or disturbances of the process sequence, for the entire installation, and thereby ensures, in a particularly simple manner, reliable control and monitoring of the entire installation without causing a possible overload for the operating personnel.

It is a further object of the invention to provide a novel apparatus which is particularly suitable for carrying out the method.

With the above and other objects in view there is provided, in accordance with the invention, a method of processing data of a technical installation, wherein the data are stored in different data memories in a user-specific manner, and the installation is divided into functional groups relevant to process control and into functional groups relevant to the installation, the method which comprises the following steps:

assigning functional groups for process control and functional groups for the installation to respective selection fields of a common selection mask; representing the selection fields representing the functional groups in a first display level of the common selection mask and displaying relationships between mutually interacting functional groups in connections between the selection fields; and upon a selection of one of the selection fields, selecting the respective process data relevant to the process control of the installation or installation data relevant to the installation and displaying the process data in a further display level.

The method applies to the processing of data of a technical installation which are stored in different data memories in a user-specific manner, the installation being subdivided into functional groups relevant to process control and into functional groups relevant to the installation. The above-noted objects are achieved according to the invention in that both the functional groups for process control and the functional groups for the installation are each assigned to a selection field of a common selection mask, the selection fields representing the functional groups being represented in a first display level of the selection mask in such a way that the relations between the mutually interacting functional groups are displayed by means of connections between the selection fields, and, by selecting one of the selection fields, the respective process data relevant to the process control of the installation or installation data relevant to the installation being selected and displayed in a further display level.

The invention is thereby based on the consideration that, by means of an operational control system based on a plurality of different hardware and software systems, both present, dynamic process data for the process control and static installation data for the installation can be processed, filtered, compressed and/or structured. A complete overview of the complex installation process and the installation can be displayed easily only when the data or information of the different data processing systems are subdivided into a number of functional groups for the installation process and for the installation structure. Such a complex display encompassing both the functional groups for the process control and the functional groups for the installation can be created more rapidly if these functional groups are filtered, compressed and/or structured in accordance with their relations with one another and also with regard to the stock of data associated with the respective functional group. In this case, the intention is to output the functional groups and, associated therewith, the information or data of different data sources or databases in hierarchically constructed levels of different display depths on an output device, e.g. a computer screen. In this case, it is particularly advantageous if the relations between functional groups which interact with one another are also displayed by means of correspondingly visible connections on the output device. Using such display levels constructed from selection fields, fast and reliable selection of individual data or partial areas of data from a number of particularly extensive and, in particular, different stocks of data can then be carried out by selecting the respective selection fields.

Through the joint display of present, dynamic process data and static installation data, not only the instantaneous process state but also resultant measures for maintenance can be identified and possible disturbances eliminated. The integration of state knowledge and maintenance strategies enables adequate, fast and economical monitoring and maintenance of the installation at different working levels.

As a result of a modular and hierarchical construction of the operational control system, each functional group respectively expediently comprises a number of functional levels which are respectively assigned a number of further display levels of the selection mask. By selecting one of the selection fields of a display level, a partial area of data which is associated with the relevant functional level is selected and displayed, analogously to selecting an individual functional group. Such a hierarchical construction of the selection mask from a number of display levels which each represent a functional level or a functional group enables the operating personnel to control and monitor all functions and information or data for the process control and for the installation from a workstation.

In accordance with an added feature of the invention, the functional groups and/or the functional levels are stored with the respectively associated relations in a separate data memory. Such storage of the relations, which, in particular, reproduce the mutual interactions and mutual relationships between the functional groups and/or the functional levels, and the display of these relations (e.g. connecting lines) enable a statement to be made about the state of the entire installation and the installation sections thereof depending on instantaneous maintenance measures and maintenance strategies.

With the above and other objects in view there is further provided, in accordance with the invention, an apparatus for processing data of a technical installation that are stored in different data memories in a user-specific manner. The apparatus comprises: a selection mask having a plurality of selection fields assigned to the functional groups relevant to process control and to the functional groups relevant to the installation, the selection mask having a first display level for displaying the selection fields with relationships between mutually interacting functional groups indicated with connections between the selection fields, and a further display level, whereby a selection of a given selection field initiates a selection and display of the respective process data relevant to the process control of the installation or installation data relevant to the installation in the further display level.

In other words, a selection mask having a plurality of selection fields which are assigned both functional groups for process control and functional groups for the installation, the selection fields representing the functional groups being represented in a first display level of the selection mask in such a way that the relations between the mutually interacting functional groups are displayed by means of connections between the selection fields, and, by selecting one of the selection fields, the respective process data relevant to the process control of the installation or installation data relevant to the installation being able to be selected and displayed in a further display level. Each partial area of the stock of data can be selected in a particularly simple manner by selecting a combination of selection fields and/or individual alternatives in the selection fields of the selection mask.

In accordance with another feature of the invention, each functional group respectively comprises a number of functional levels respectively assigned a number of further display levels of the selection mask, and wherein, upon a selection of the selection fields of a display level, a partial area of the data associated with the relevant functional level can be selected and displayed.

In accordance with a further feature of the invention, there is provided a relational database for storing at least one of the functional groups and/or the functional levels with the respectively associated relationships.

The particular advantages attained by the invention are that by dividing the entire installation process and the entire installation into a small number of logical functional groups which e.g. each represent process sections or required installation functions, a high degree of automation is achieved with extremely high information compression to a small number of process data and installation sections to be observed. Furthermore, irrespective of the data processing system used, it is possible to call up the selection mask in each hierarchical level on a respectively associated workstation or operator station. In other words: the selection mask can be called on an operating station both of a superordinate management or maintenance system and of a subordinate and technically more powerful process control system. Consequently, the entire installation process can be controlled and monitored in every operating phase from every operating site by just one person.

With the above and other objects in view there is also provided, in accordance with the invention, a software program for a graphical user interface in a computer system of a technical installation, with a method of providing and selecting from a menu on the display, the method which comprises the following method steps:

storing data of a technical installation in a plurality of data memories in accordance with a functional division of the installation into functional groups relevant to process control and into functional groups relevant to the installation;

providing a common selection mask with a first display level and a further display level, and assigning the functional groups for process control and the functional groups for the installation to respective selection fields of the common selection mask;

displaying, on the computer system display, the selection fields representing the functional groups in the first display level of the common selection mask and displaying relationships between mutually interacting functional groups with connections between the selection fields; and upon a selection of one of the selection fields by a user, selecting the respective process data relevant to the process control of the installation or installation data relevant to the installation and displaying the process data in the further display level.

Furthermore, there is provided, in accordance with the invention, a computer-readable medium having stored thereon a data structure comprising:

a first level defining a technical installation with functional groups relevant to process control and functional groups relevant to the installation, and for acquiring data stored in different data memories in a user-specific manner;

a selection mask having a plurality of selection fields assigned to the functional groups relevant to process control and to the functional groups relevant to the installation, the selection mask having a first display level for displaying the selection fields with relationships between mutually interacting functional groups indicated with connections between the selection fields, and a further display level; the selection mask interacting with a program control such that a selection of a given selection field initiates a display of the respective process data relevant to the process control of the installation or installation data relevant to the installation in the further display level.

Other features which are considered as characteristic for the invention are set forth in the appended claims.

Although the invention is illustrated and described herein as embodied in a method and apparatus for processing data of a technical installation that are stored in different data memories in a user-specific manner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

Mutually corresponding parts are provided with the same reference symbols in the two figures.

DESCRIPTION OF THE PREFERRED EMBODIMENTS

Figure 1:
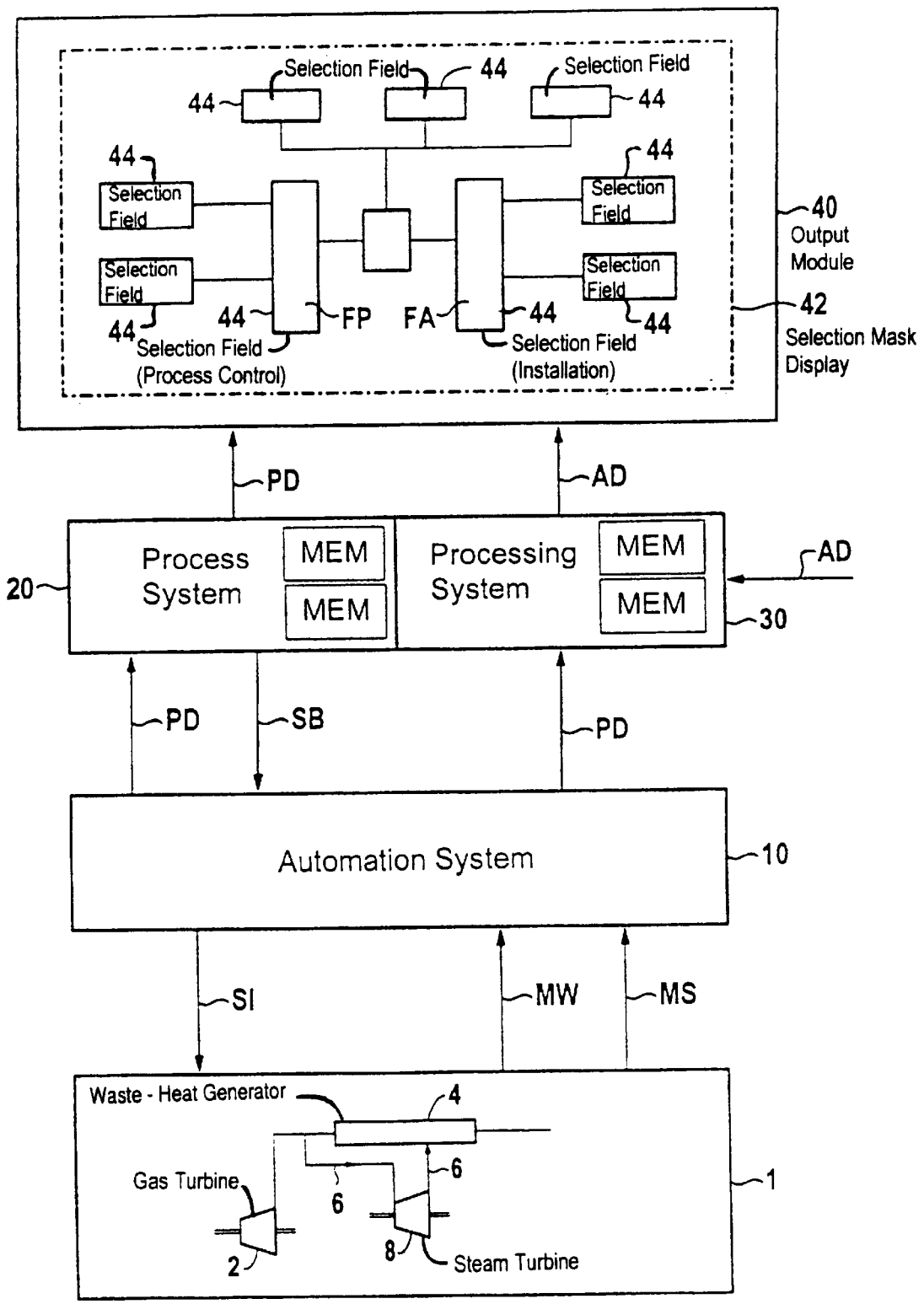
FIG. 1 is a schematic block diagram of a processing system for data of a technical installation.

Referring now to the figures of the drawing in detail and first, particularly, to FIG. 1 thereof, there is seen a diagrammatic illustration of a gas and steam turbine installation representing the technical installation 1. The exemplary system comprises a gas turbine 2 and a waste-heat steam generator 4, which is connected downstream of the turbine on the flue gas side and whose heating surfaces are connected—in a manner that is not specifically illustrated—into the water/steam circuit 6 of a steam turbine 8. Measured values MW acquired in the installation 1 and indication signals MS output therefrom are fed to an automation system 10.

In automation units of the automation system 10, on the one hand the measured values MW and the indication signals MS are preprocessed and converted into process data PD. For control purposes, on the other hand, control signals SI are output therefrom to the installation sections or components 2, 4, 6, 8 of the installation 1. The process data PD are fed to a central process system 20, for example a process control and process information system. For control purposes, the central process system 20 outputs control commands SB to the automation system 10, which are converted there into control signals SI. In this case, the process system 20 may be, in particular, a personal computer or another data processing unit. The central process system 20 serves, in particular, for process control and process monitoring. Because of the complexity of the installation process and because of the measures that may have to be initiated quickly in the event of a fault, the automation system 10 and the central process system 20 are constructed for example from rapidly reacting stored-program controllers or from powerful workstations.

The process data PD are furthermore fed to a processing system 30. The processing system 30, which serves for maintenance and state monitoring of the installation 1, is based on a computer generation with a different performance level compared with the process system 20. Information items in the form of installation data AD, which are relevant to the operational control of the installation 1, are communicated to the processing system 30 by data processing systems (not specifically illustrated) such as, for instance, a personal computer of the installation area "Finances" or "Materials Management."

For the purpose of process analysis and evaluation, the process data PD are stored in data memories of the process system 20. Because of the complexity of the installation 1 and, as a result of this, the large quantity of process data PD to be processed, appropriate database systems, for instance, Oracle database, SQL Server, are provided as data memories. The installation data AD, on the other hand, are stored in correspondingly different data memories, since the processing system 30 is based on different hardware.

The automation system 10, the central process system 20 and the processing system 30 are connected to one another via a data bus for data exchange. The process data PD and the installation data AD of the process system 20 and of the processing system 30, respectively, are fed to an output module 40 by means of the data bus. By way of example, the output module 40 is a screen of an operating station or workstation of the process system 20 or of the processing system 30.

The entire process of the installation 1 is advantageously subdivided into a number of functional groups FP which are relevant to process control and by which the installation 1 is controlled and monitored. By way of example, these functional groups FP are organized hierarchically, in accordance with the logical process sequence of the installation 1, in the following order: supply, disposal, transport of process heat, conversion of primary energy into thermal energy, conversion of the thermal energy into electrical energy, visualization, balances, etc. The processing system 30 is likewise subdivided into a number of functional groups FA which are relevant to the installation 1 and serve for maintenance and administration of the installation 1. These functional groups FA relevant to the installation are likewise organized hierarchically in accordance with the logical structure of the installation 1, for example: material, costs, documentation, investment, service, etc.

For efficient operational control that is optimized in respect of time, both the functional groups FP for the process control and the functional groups FA for the installation 1 can be displayed graphically in a selection mask 42 of an output module 40. To that end, the selection mask 42 comprises a plurality of selection fields 44 which each represent one of the functional groups FP, FA.

The individual selection fields 44 are connected to one another in dependence on the interactions existing between the respective functional groups FP and FA. In other words, the connections of the individual selection fields 44 represent the relationships between the individual functional groups FP, FA. The functional groups FP, FA with the associated relations are stored in a further data memory of the process system 20 and/or of the processing system 30. A relational database thereby serves as the data memory.

The selection mask 42 allows selecting an individual selection field 44, and thus allows the process data PD or installation data AD relevant to the respective functional group FP or FA to be selected and displayed on a further display level. Consequently, the levels that are structured hierarchically by the installation process and the installation 1, such as, for example, the process level for the installation 1, the automation level for the automation system 10, the operating level for the process system 20 and the corporate level for the processing system 30, are represented by corresponding display levels in the selection mask 42.

Figure 2:
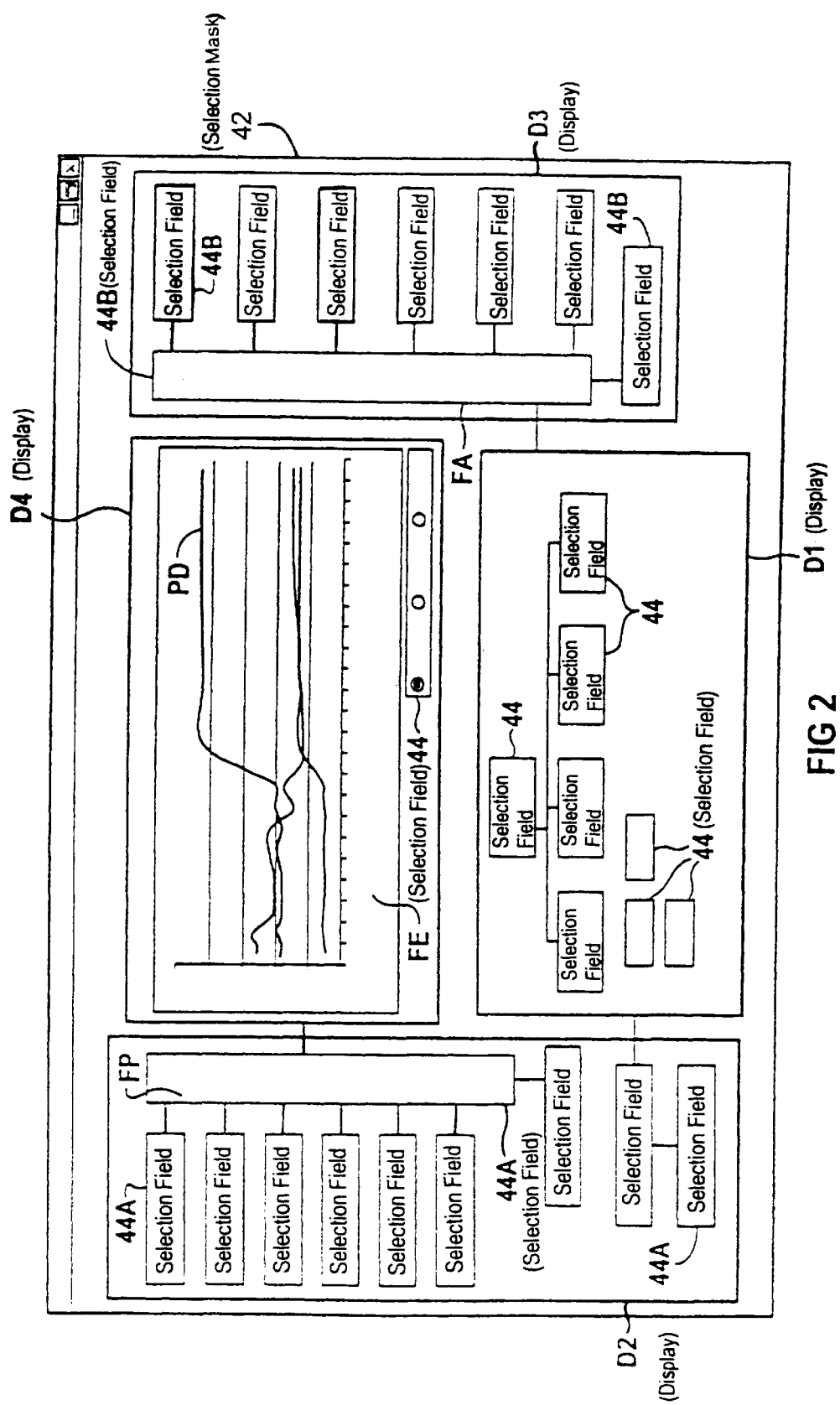
FIG. 2 is a detail II of FIG. 1 on a larger scale with components of a selection mask.

Referring now to FIG. 2, there is shown an example of a selection mask 42 having four display levels D1 to D4. The display level D1 represents the complete overview of the installation 1. The technological structure of the installation 1 is thereby displayed in the form of selection fields 44. By selecting one of the selection fields 44, the associated partial area of the installation data AD and/or of the process data PD is then selected and represented in a further, non-illustrated display level Dx.

The display levels D2 and D3 represent the functional groups FP which are relevant to the installation process and, respectively the functional groups FA which are relevant to the installation 1. By selecting the selection field 44A or 44B for the functional group FP "visualization" or for the functional group FA "service", a functional level FE associated with this functional group FA or FB is selected and displayed in the display level D4. The display level D4 shows the process data PD associated with this functional level FE in the form of a graph. Depending on the structure and complexity of the process of the installation 1, instead of process data PD being displayed, it is possible to display the technological structure of the functional level FE in the form of selection fields 44 analogously to the display level D1.

Depending on the selection of the selection fields 44, 44A and 44B, the individual display levels D1 to D4 can be displayed in a common selection mask 42, for example. As an alternative, it is possible to represent each display level D1 to D4 in the entire selection mask 42, with the area of the selection mask 42 being utilized to the greatest possible extent.

According to demand and requirement, such a modularly constructed selection mask 42 can thus be used to display process-relevant process data PD, e.g. acknowledgement, state messages, fault messages, etc., together with operationally relevant installation data AD, e.g. inspection cycles, fuel consumption, fuel costs. The entire process proceeding in the installation 1 can thus be monitored in all of the operating phases by just one person. It is thereby ensured, in particular, that information or data of different functional groups FP, FD appertaining to process control and maintenance of the installation 1 are graphically displayed simultaneously by means of the selection mask 42, through integration of the various data processing systems, such as, for example, the automation system 10, the process system 20, and the processing system 30.

The term "computer-readable medium" as used herein includes any type of computer memory, including floppy disks, hard disks, CDs, flash ROMs, non-volatile ROM, RAM, and direct remote-connections to such storage devices.

We claim:

1. A method of processing data of a technical installation, wherein the data are stored in different data memories in a user-specific manner, and the installation is divided into functional groups relevant to process control and into functional groups relevant to the installation, the method which comprises the following steps:

assigning functional groups for process control and functional groups for the installation to respective selection fields of a common selection mask;

representing the selection fields representing the functional groups in a first display level of the common selection mask and displaying relationships between mutually interacting functional groups in visible connections between the selection fields;

upon a selection of one of the selection fields, selecting the respective process data relevant to the process control of the installation or installation data relevant to the installation and displaying the respective process data in a further display level;

providing the common selection mask with four display levels including a display level representing a complete overview of the installation, a display level representing the functional groups relevant to process control, a display level representing the functional groups relevant to the installation, and a further display level showing the process data associated with the currently selected selection field; and simultaneously displaying all of the four display levels.

2. In combination with a technical installation having functional groups relevant to process control and functional groups relevant to the installation, an apparatus for processing data stored in different data memories in a user-specific manner, comprising: a selection mask having a plurality of selection fields assigned to the functional groups relevant to process control and to the functional groups relevant to the installation, said selection mask having a first display level for displaying the selection fields with relationships between mutually interacting functional groups indicated with visible connections between the selection fields, and a further display level, whereby a selection of a given selection field initiates a selection and display of the respective process data relevant to the process control of the installation or installation data relevant to the installation in said further display level, said selection mask having four display levels including a display level representing a complete overview of the installation, a display level representing the functional groups relevant to process control, a display level representing the functional groups relevant to the installation, and a further display level showing the process data associated with the currently selected selection field, all of said four display levels being displayed simultaneously.

3. In a computer system of a technical installation, the computer system having a graphical user interface including a display and a selection device, a method of providing and selecting from a menu on the display, the method which comprises:

storing data of a technical installation in a plurality of data memories in accordance with a functional division of the installation into functional groups relevant to process control and into functional groups relevant to the installation;

providing a common selection mask with a first display level and a further display level, and assigning the functional groups for process control and the functional groups for the installation to respective selection fields of the common selection mask;

displaying, on the computer system display, the selection fields representing the functional groups in the first display level of the common selection mask and displaying relationships between mutually interacting functional groups with visible connections between the selection fields;

upon a selection of one of the selection fields by a user, selecting the respective process data relevant to the process control of the installation or installation data relevant to the installation and displaying the respective process data in the further display level;

providing the common selection mask with four display levels including a display level representing a complete overview of the installation, a display level representing the functional groups relevant to process control, a display level representing the functional groups relevant to the installation, and a display level showing the process data associated with the currently selected selection field; and simultaneously displaying all of the four display levels.

4. A computer-readable medium having stored thereon a data structure comprising:

a first level defining a technical installation with functional groups relevant to process control and functional groups relevant to the installation, and for acquiring data stored in different data memories in a user-specific manner;

a selection mask having a plurality of selection fields assigned to the functional groups relevant to process control and to the functional groups relevant to the installation, the selection mask having a first display level for displaying the selection fields with relationships between mutually interacting functional groups indicated with visible connections between the selection fields, and a further display level;

said selection mask interacting with a program control such that a selection of a given selection field initiates a display of the respective process data relevant to the process control of the installation or installation data relevant to the installation in the further display level, said selection mask having four display levels including a display level representing a complete overview of the installation, a display level representing the functional groups relevant to process control, a display level representing the functional groups relevant to the installation, and a further display level showing the process data associated with the currently selected selection field, all of said four display levels being displayed simultaneously.

* * * * *